US010562346B2

(12) United States Patent
Kamiyama et al.

(10) Patent No.: US 10,562,346 B2
(45) Date of Patent: Feb. 18, 2020

(54) VEHICLE WHEEL WITH SUB AIR CHAMBER

(71) Applicant: HONDA MOTOR CO., LTD., Minato-ku, Tokyo (JP)

(72) Inventors: Youichi Kamiyama, Wako (JP); Katsushi Ishii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 531 days.

(21) Appl. No.: 15/124,416

(22) PCT Filed: Mar. 11, 2015

(86) PCT No.: PCT/JP2015/057082
§ 371 (c)(1),
(2) Date: Sep. 8, 2016

(87) PCT Pub. No.: WO2015/137369
PCT Pub. Date: Sep. 17, 2015

(65) Prior Publication Data
US 2017/0021666 A1     Jan. 26, 2017

(30) Foreign Application Priority Data
Mar. 13, 2014 (JP) ................................. 2014-050715

(51) Int. Cl.
*B60B 21/02*     (2006.01)
*B60B 21/12*     (2006.01)

(52) U.S. Cl.
CPC .............. *B60B 21/02* (2013.01); *B60B 21/12* (2013.01); *B60B 2900/133* (2013.01)

(58) Field of Classification Search
CPC ....... B60B 21/12; B60B 21/02; B60B 21/026; B60B 21/023
See application file for complete search history.

(56) References Cited

U.S. PATENT DOCUMENTS

| 7,690,410 B2 | 4/2010 | Kamiyama et al. |
| 2008/0179939 A1* | 7/2008 | Kusaka ................. B60B 21/023 301/95.104 |
| 2017/0096028 A1* | 4/2017 | Kamiyama ........... B60B 21/026 |

FOREIGN PATENT DOCUMENTS

| JP | 4551422 B2 | 9/2010 |
| JP | 2012016973 A * | 1/2012 |
| JP | 2012016973 A | 1/2012 |

(Continued)

OTHER PUBLICATIONS

Office Action from Japanese Patent Office corresponding to U.S. Appl. No. 15/124,416.

(Continued)

*Primary Examiner* — Scott A Browne
(74) *Attorney, Agent, or Firm* — Carrier Blackman & Associates, P.C.; William D. Blackman; Joseph P. Carrier (57) ABSTRACT

The vehicle wheel (1) of the present invention is characterized by including: a main body (13) which forms a sub air chamber (SC) in a space surrounded by a top plate (25a), a bottom plate (25b) and a pair of side plates (25c, 25d); and edge portions (14a, 14b) which extend from the main body (13), and are respectively fitted into a pair of grooves (17a, 17b) formed in a well portion (11c) so as to attach the main body (13) to the well portion (11c). The edge portions (14a, 14b) respectively extend from the joints (25e, 25f) between the top plate (25a) and the side plates (25c, 25d).

2 Claims, 7 Drawing Sheets

(56) References Cited

FOREIGN PATENT DOCUMENTS

JP  2015-171876 A  1/2015
JP  2015171876 A  10/2015

OTHER PUBLICATIONS

Office Action, dispatched from the JPO dated Feb. 7, 2017, issued in corresponding Japanese Patent Application 2016-507773, with the English translation thereof.

* cited by examiner

VEHICLE WHEEL WITH SUB AIR CHAMBER

TECHNICAL FIELD

The present invention relates to a vehicle wheel.

BACKGROUND ART

Conventionally, there has been known a wheel in which Helmholtz resonators (sub air chamber members) to mute air column resonance in a tire air chamber are attached to an outer circumferential surface of a well portion (for example, see Patent Document 1). The sub air chamber member of the wheel includes a main body having a sub air chamber therein, and edge portions respectively provided on both sides of the main body. The main body includes a bottom plate disposed on the outer circumferential surface of the well portion, and a top plate forming the sub air chamber between itself and the bottom plate. The edge portions connect the bottom plate and the upper plate, and respectively extend in a wheel width direction from the both sides of the main body. Further, the wheel has grooves into which ends of the edge portions of the sub air chamber member are respectively fitted, and the grooves are formed in a rising portion of the well portion and on a vertical wall erected on the outer circumferential surface of the well portion. When the sub air chamber member is attached to the outer circumferential surface of the well portion, one edge portion out of the both edge portions is first fitted into one of the grooves. Then, the other edge portion is pressed toward the outer circumferential surface of the well portion by a pusher or the like so that the other edge portion is fitted into the other groove. Thus, since the ends of the both edge portions are respectively fitted into the two grooves, the sub air chamber member is attached to the outer circumferential surface of the well portion.

CITATION LIST

Patent Literature

[Patent Document 1]
Japanese Patent Publication No. 4551422

SUMMARY OF INVENTION

Technical Problem

Meanwhile, it is desirable that a volume of the sub air chamber is largely ensured so that the Helmholtz resonator can exhibit sufficient silencing effect. Therefore, in the wheel, it is considered to extend the well portion inwardly in a wheel radial direction (to a rotation axis side). Thus, a space for housing the main body of the sub air chamber member in the tire air chamber is extended inwardly in the wheel radial direction, and thus it is possible to design the wheel such that the volume of the sub air chamber in the main body is increased. However, when the main body is arranged to be extended in accordance with the well portion which is extended inwardly in the wheel radial direction, positions of the edge portions are also relatively biased inwardly in the wheel radial direction. Therefore, when the sub air chamber member is attached to the well portion as described above, a pressing distance to feed the end of the edge portion into the groove portion by pressing the edge portion with the pusher or the like is increased. Thus, the vehicle wheel, in which the pressing distance for the edge portion is short and attachment of the sub air chamber member to the well portion is simple, and which can ensure the volume of the sub air chamber larger than that of the prior art, is desired.

An object of the present invention is to provide a vehicle wheel, in which the attachment of the sub air chamber member to the well portion is simple, and which can ensure the volume of the sub air chamber larger than that of the prior art.

Solution to Problem

In order to solve the above problems, a vehicle wheel of the present invention is the vehicle wheel having sub air chamber members as Helmholtz resonators attached to an outer circumferential surface of a well portion of the vehicle wheel, wherein the sub air chamber member includes: a main body which forms a sub air chamber in a space surrounded by a top plate, a bottom plate, and a pair of side plates respectively rising outwardly in a wheel radial direction from both ends in a wheel width direction of the bottom plate; and edge portions which respectively extend from both ends in the wheel width direction of the main body, and are respectively fitted into a pair of grooves formed in the well portion, so that the main body is attached to the well portion, and wherein the edge portions extend from joints between the top plate and the side plates.

This vehicle wheel is different from the sub air chamber member of the conventional vehicle wheel, and the main body includes the side plates in addition to the top plate and the bottom plate. Then, the edge portions extend from portions in which the top plate and the side plates rising from the both ends of the bottom plate intersect each other. Therefore, with the vehicle wheel, even when the main body is arranged to be extended in accordance with the well portion which is extended inwardly in the wheel radial direction, positions of the edge portions in the wheel radial direction are not varied significantly owing to existence of the side plates. With this vehicle wheel, it is possible to ensure a volume of the sub air chamber larger than that of the prior art, and attachment operation is simple when the sub air chamber member is attached to the outer circumferential surface of the well portion by pressing the edge portion with the pusher or the like.

Further, this vehicle wheel can be configured such that the pair of grooves are respectively formed in a first vertical wall surface defined by one rising portion of a rim forming the well portion and in a second vertical wall surface defined by the other rising portion of the rim forming the well portion.

Meanwhile, when the well portion is extended inwardly in the wheel radial direction in order to largely ensure the sub air chamber, it is also required to increase a height of the vertical wall in which one groove is formed, in the conventional vehicle wheel (for example, see Patent Document 1). In contrast, the vehicle wheel of the present invention is different from the conventional vehicle wheel (for example, see Patent Document 1), and the two grooves are respectively formed in the two rising portions of the rim forming the well portion. Therefore, even when the well portion is extended inwardly in the wheel radial direction, the height of the rising portion of the well portion is also inevitably increased. Thus, with the vehicle wheel of the present invention, it is possible to increase the volume of the sub air chamber by extending the well portion inwardly in the wheel radial direction without significant design change such as changing the height of the vertical wall as in the conventional vehicle wheel (for example, see Patent Document 1).

Further, this vehicle wheel can be configured such that the pair of side plates of the sub air chamber member respectively rise outwardly in the wheel radial direction from the both ends in the wheel width direction of the bottom plate along the rising portions respectively corresponding to the side plates.

With this vehicle wheel, it is possible to make the most of a space for housing the sub air chamber member formed between the two rising portions of the well portion, thereby ensuring a volume of the sub air chamber member more largely.

Further, this vehicle wheel can be configured such that the edge portions respectively extend in rising directions of the side plates from the joints.

With this vehicle wheel, it is also possible to arrange the edge portions along the rising portions of the well portion together with the side portions, thereby utilizing the space for housing the sub air chamber member more efficiently.

Further, this vehicle wheel can be configured such that the first vertical wall surface and the second vertical wall surface respectively have projecting portions which project inwardly in the wheel width direction, wherein the pair of grooves are respectively inside the projecting portions in the wheel radial direction, and respectively formed between the first vertical wall surface and the projecting portion of the first vertical wall surface, and between the second vertical wall surface and the projecting portion of the second vertical wall surface, and wherein tips of the edge portions are respectively fitted into the pair of the grooves.

In this vehicle wheel, since the tips of the edge portions are fitted into the grooves so as to be pressed inwardly in the wheel radial direction of the projecting portions, the main body of the sub air chamber member can be firmly supported by the well portion via the edge portions even when the vehicle wheel rotates so that centrifugal force is applied to the sub air chamber member.

Advantageous Effects of Invention

According to the present invention, it is possible to provide a vehicle wheel, in which the attachment of the sub air chamber member to the well portion is simple, and which can ensure the volume of the sub air chamber larger than that of the prior art.

DESCRIPTION OF EMBODIMENTS

Figure 1:
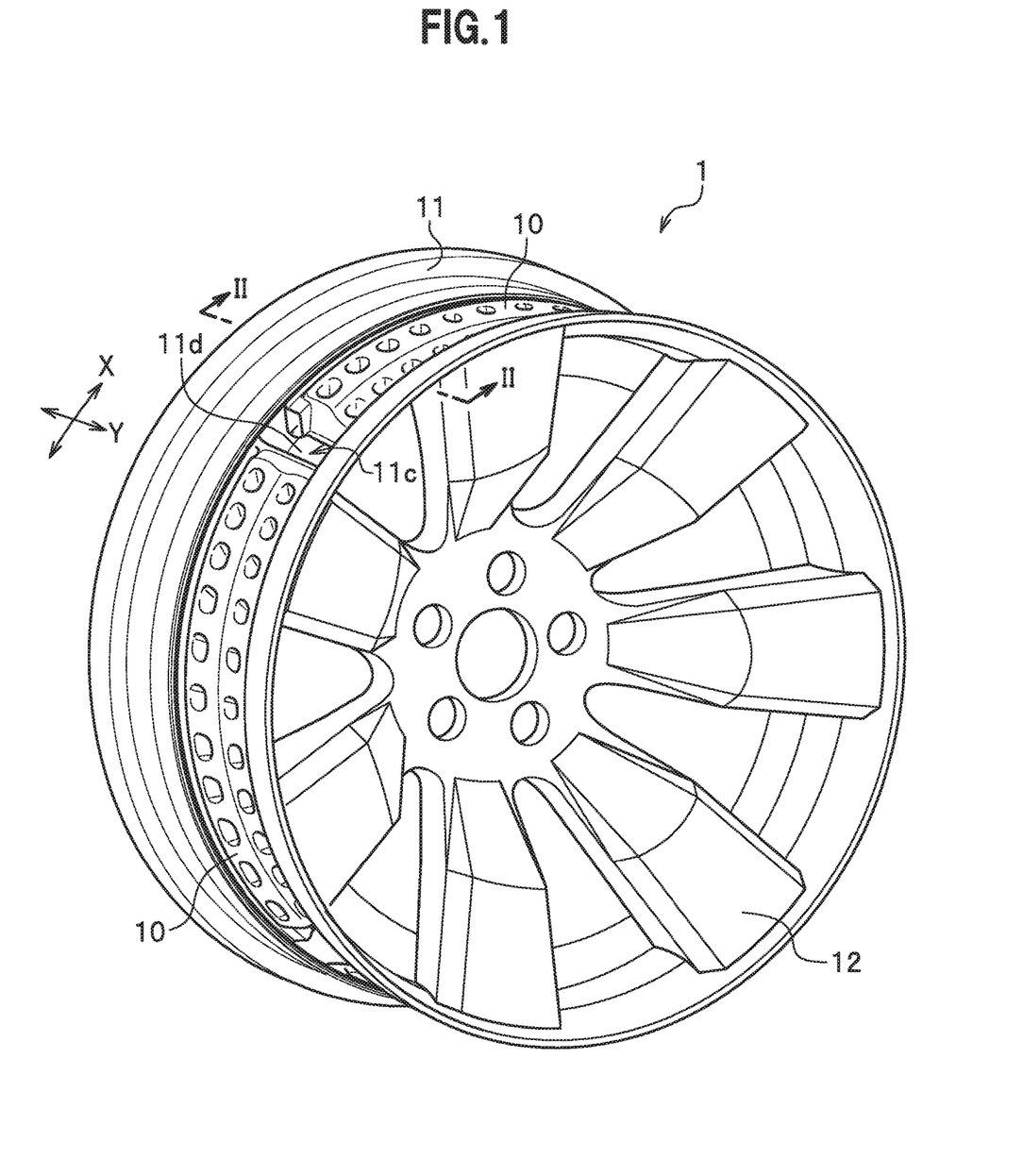
FIG. 1 is a perspective view of a vehicle wheel according to an embodiment of the present invention.

Hereinafter, an embodiment of the present invention will be described in detail with reference to the drawings. FIG. 1 is a perspective view of a vehicle wheel 1 according to an embodiment of the present invention. As shown in FIG. 1, the vehicle wheel 1 of the present embodiment has a plurality of sub air chamber members 10 as Helmholtz resonators at regular intervals in a circumferential direction X. Incidentally, in the present embodiment, the vehicle wheel 1 is assumed to have four sub air chamber members 10.

The vehicle wheel 1 according to the present embodiment includes a rim 11 and a disk 12 for connecting the rim 11 to a hub (not shown). The sub air chamber members 10 are attached to be fitted into an outer circumferential surface 11d of a well portion 11c in the rim 11.

<Rim>

Figure 2:
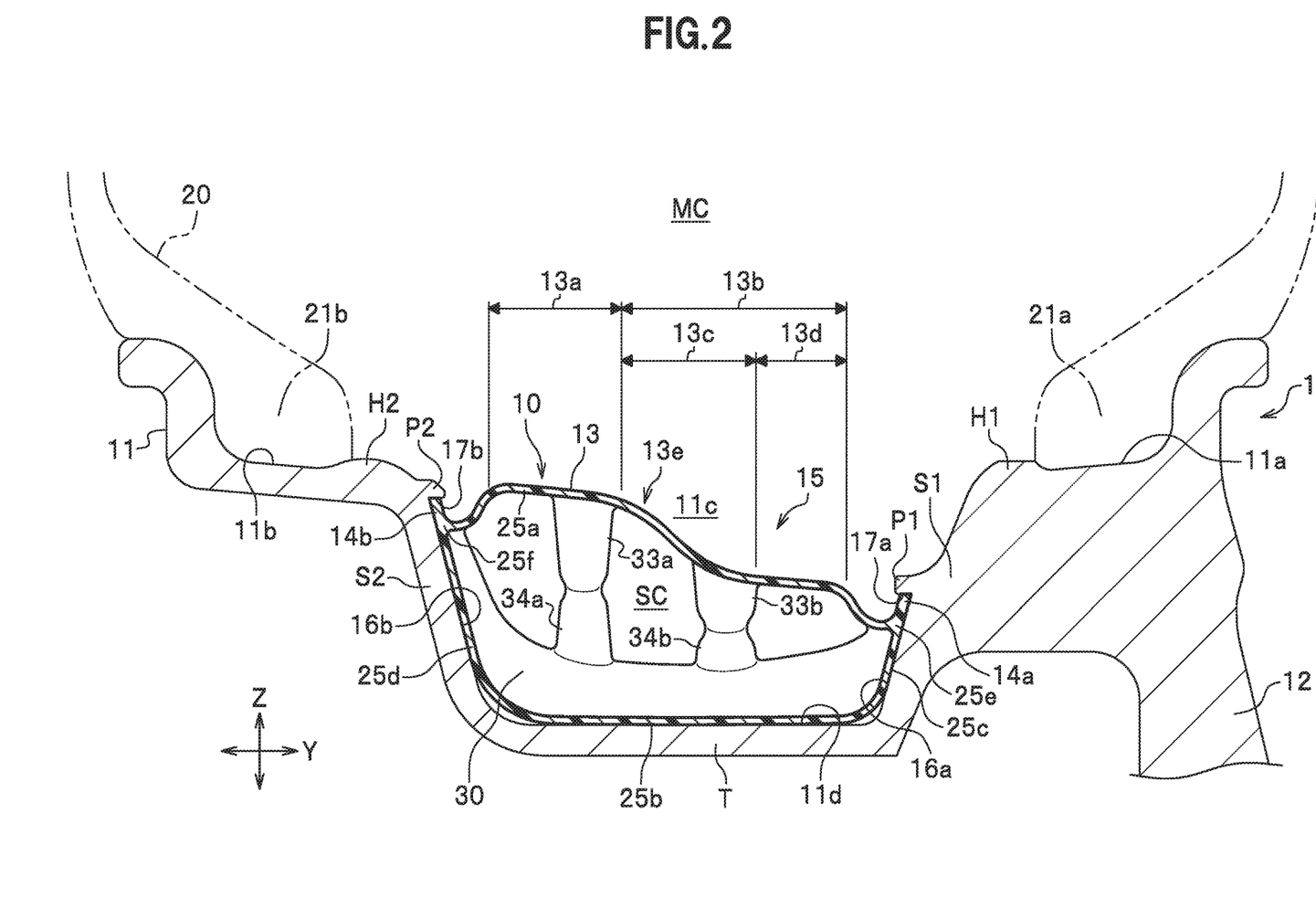
FIG. 2 is a partially enlarged cross-sectional view taken along line II-II of FIG. 1.

First, the rim 11 to which the sub air chamber member 10 is attached will be described. FIG. 2 is a partially enlarged cross-sectional view taken along line II-II of FIG. 1. Note that, FIG. 2 partially shows vicinity of beads 21a, 21b of a tire 20 to be assembled to the rim 11 in imaginary lines (two-dot chain lines). As shown in FIG. 2, the rim 11 has the well portion 11c which is recessed inwardly (downwardly in FIG. 2) in a wheel radial direction Z between bead seats 11a, 11b formed at both end portions in a wheel width direction Y of the rim 11.

The well portion 11c of the present embodiment has a body portion T and a pair of rising portions S1, S2 which face each other across the body portion T in the wheel width direction Y. The body portion T has a cylindrical shape having substantially the same diameter across the wheel width direction Y. The rising portions S1, S2 are respectively formed to rise outwardly (upwardly in FIG. 2) in the wheel radial direction Z from a surface of the body portion T, that is, from the outer circumferential surface 11d of the well portion 11c.

The rising portion S1 defines a first vertical wall surface 16a between a hump portion H1 and one end portion of the outer circumferential surface 11d. When it is assumed that outside in the wheel radial direction Z is upper side, the first vertical wall surface 16a is inclined to rise from the one end portion of the outer circumferential surface 11d to the hump portion H1. Further, the rising portion S2 defines a second vertical wall surface 16b between a hump portion H2 and the other end portion of the outer circumferential surface 11d. When it is assumed that the outside in the wheel radial direction Z is the upper side, the second vertical wall surface 16b is inclined to rise from the other end portion of the outer circumferential surface 11d to the hump portion H2.

The first vertical wall surface 16a has a projecting portion P1 projecting inwardly in the wheel width direction in an approximately middle between the hump portion H1 and the one end of the outer circumferential surface 11d. The projecting portion P1 extends in a wheel circumferential direction X (see FIG. 1) on the first vertical wall surface 16a and has an annular shape around a wheel rotation axis (not shown).

The projecting portion P1 and the first vertical wall surface 16a cooperatively form a groove 17a. In particular, the groove 17a is formed inside the projecting portion P1 in the wheel radial direction Z and between the projecting portion P1 and the first vertical wall surface 16a, or in other words, at a corner portion formed between the projecting portion P1 and the first vertical wall surface 16a. A tip of an edge portion 14a of the sub air chamber member 10 is pressed against the groove 17a, to be fitted into the groove 17a. The groove 17a is formed in the wheel circumferential direction X (see FIG. 1) on the first vertical wall surface 16a.

The second vertical wall surface 16b is formed with a projecting portion P2 in proximity to the hump portion H2. The projecting portion P2 is formed to extend inwardly in the wheel width direction Y, and extends in the wheel circumferential direction X (see FIG. 1) on the second vertical wall surface 16b, to have an annular shape around the wheel rotation axis (not shown).

The projecting portion P2 and the second vertical wall surface 16b cooperatively form a groove 17b. In particular, the groove 17b is formed inside the projecting portion P2 in the wheel radial direction Z and between the projecting portion P2 and the second vertical wall surface 16b, or in other words, at a corner portion formed between the projecting portion P2 and the second vertical wall surface 16b. A tip of an edge portion 14b of the sub air chamber member 10 is pressed against the groove 17b, to be fitted into the groove 17b. The groove 17b is formed in the wheel circumferential direction X (see FIG. 1) on the second vertical wall surface 16b.

Note that, in FIG. 2, reference numeral MC is a tire air chamber. Further, reference numeral 13 is a main body of the sub air chamber member 10 which will be described subsequently, reference numeral 13a is a first region of the main body 13, reference numeral 13b is a second region of the main body 13, reference numeral 13c is a connection region of the main body 13, reference numeral 13d is a skirt region of the main body 13, and reference numeral 13e is a boundary between the first region 13a and the connection region 13c. Reference numeral 25a is a top plate constituting the main body 13, reference numeral 25b is a bottom plate constituting the main body 13, and reference numerals 25c and 25d are side plates constituting the main body 13. Further, reference numerals 25e and 25f are joints between the top plate 25a and the side plates 25c, 25d. Reference numeral 15 is a recessed portion formed in the main body 13, reference numeral 30 is a bead, reference numerals 33a, 33b are upper connection portions, reference numerals 34a, 34b are lower connection portions, and reference numeral SC is a sub air chamber.

<Sub Air Chamber Member>

Figure 3:
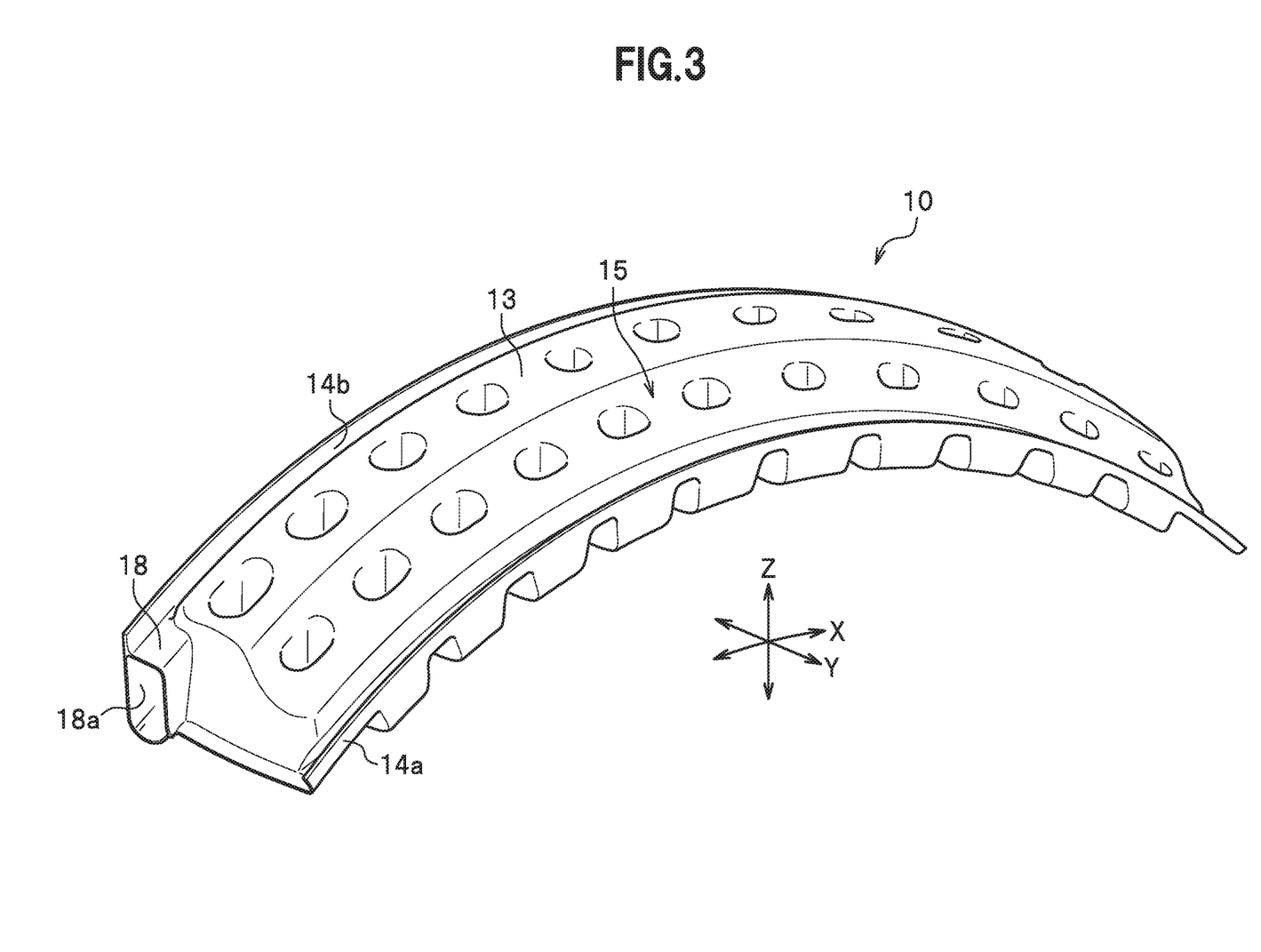
FIG. 3 is an overall perspective view of a sub air chamber member.

FIG. 3 is an overall perspective view of the sub air chamber member 10. In FIG. 3, reference numeral X indicates the wheel circumferential direction when the sub air chamber member 10 is attached to the well portion 11c (see FIG. 1) of the rim 11 (see FIG. 1), and reference numeral Y indicates the wheel width direction.

As shown in FIG. 3, the sub air chamber member 10 is an elongated member in the wheel circumferential direction X, and includes the main body 13, a tubular body 18 and the edge portions 14a, 14b.

(Main Body)

The main body 13 is formed elongated in the circumferential direction so as to curve in accordance with curvature of the circumferential direction of the outer circumferential surface 11d (see FIG. 1). A plurality of beads 30 which will be described in detail below are formed inside (downside in FIG. 3) in the wheel radial direction Z of the main body 13. In FIG. 3, the reference numeral 15 is the recessed portion which will be described subsequently.

Returning to FIG. 2, the recessed portion 15 is formed such that a partial region outside (upper side in FIG. 2) in the wheel radial direction Z of the main body 13 is recessed inwardly (downwardly in FIG. 2) in the wheel radial direction Z. The recessed portion 15 is one (bead drop portion) for dropping the bead portions 21a, 21b of the tire 20 during assembly of the tire 20.

The recessed portion 15 of the present embodiment is formed in a region closer to the disk 12 than a central portion in the wheel width direction Y of the main body 13, but it is not limited thereto. The recessed portion 15 can be formed opposite to the disk 12 across the central portion.

In a cross-sectional view along the wheel width direction Y, the main body 13 of the present embodiment includes the first region 13a and the second region 13b, which are defined to be aligned in the wheel width direction Y. The second region 13b is formed to be recessed inwardly in the wheel radius direction Z as compared to the first region 13a, and the recessed portion 15 is formed in the second region 13b. That is, the second region 13b is formed so as to be lower than the first region 13a on the outer circumferential surface 11d of the well portion 11c. In other words, the second region 13b is formed to be reduced in diameter as compared to the first region 13a with reference to a wheel rotation center (not shown).

In more detail, the second region 13b has the skirt region 13d lower in height on the outer circumferential surface 11d of the well portion 11c as compared to the first region 13a, and the connection region 13c for connecting the first region 13a and the skirt region 13d. The connection region 13c is a part of the second region 13b, and is for not forming a step between the first region 13a and the second region 13b.

The skirt region 13d of the present embodiment is curved so as to be slightly steeper slope as it goes to the connection region 13c side, but can also form a linear rising slope. Further, the skirt region can be horizontal without forming a rising slope. The connection region 13c of the present embodiment is curved with a curvature larger than that of the skirt region 13d, and is a steeper slope as it goes to the first region 13a. Incidentally, a boundary between the connection region 13c and the skirt region 13d in the present embodiment is defined by a turning point between the curvature of the connection region 13c and the curvature of the skirt region 13d. Note that, when either of the connection region 13c and the skirt region 13d forms a linear rising slope, an inflection point thereof is the boundary between the connection region 13c and the skirt region 13d.

This main body 13 has the top plate 25a, the bottom plate 25b and a pair of side plates 25c, 25d.

The top plate 25a forms an upper surface (an outer surface in the wheel radial direction Z) of the main body 13. The top plate 25a is spaced a predetermined distance above the bottom plate 25b which will be described subsequently, to form the sub air chamber SC between itself and the bottom plate 25b. Further, the top plate 25a is curved in a reverse S-shape in accordance with a forming position of the recessed portion 15. That is, the top plate 25a is curved to form the first region 13a having a height equal to that of the rising portion S2, the skirt region 13d having a height lower than that of the first region 13a, and the connection region 13c between the first region 13a and the skirt region 13d, in the main body 13. In addition, both end portions of the top plate 25a in the wheel width direction Y are curved to be recessed inwardly in the wheel radial direction Z, and form pressing portions 35a, 35b (see FIG. 5) when the sub air chamber member 10 is attached to the well portion 11c.

The bottom portion 25b is composed of a plate body formed along the outer circumferential surface 11d of the well portion 11c. That is, the bottom plate 25b is formed flat in the wheel width direction Y, and is formed curved with substantially the same curvature as the outer circumferential surface 11d in the wheel circumferential direction X (see FIG. 1). Note that, in the present embodiment, a width in the wheel width direction Y of the bottom plate 25b including chamfered corners on both ends thereof is set equal to a width in the wheel width direction Y of the outer circumferential surface 11d.

The side plates 25c and the 25d are respectively formed to rise outwardly (upwardly in FIG. 2) in the wheel radial direction Z from the both ends in the wheel width direction Y of the bottom plate 25b. More specifically, the side plate 25c rises from one end of the base plate 25b of the well portion 11c, and is formed along an inclined surface of the first vertical wall surface 16a. Further, the side plate 25d rises from the other end of the base plate 25b of the well portion 11c, and is formed along an inclined surface of the second vertical wall surface 16b.

An upper end of the side plate 25c and an upper end of the side plate 25d, which rise from the bottom plate 25b, are respectively joined to both ends in the wheel width direction Y of the top plate 25a. Incidentally, since the top plate 25a has a height difference between the first region 13a and the second region 13b, a length in the wheel radial direction Z of the side plate 25c is shorter than a length of the side plate 25d. In the present embodiment, the length of the side plate 25c is set to be about half the length of the side plate 25d, but is not limited thereto. The sub air chamber SC described above is surrounded by the top plate 25a, the bottom plate 25b and the pair of side plates 25c, 25d, and is formed inside the main body 13.

Figure 4A:
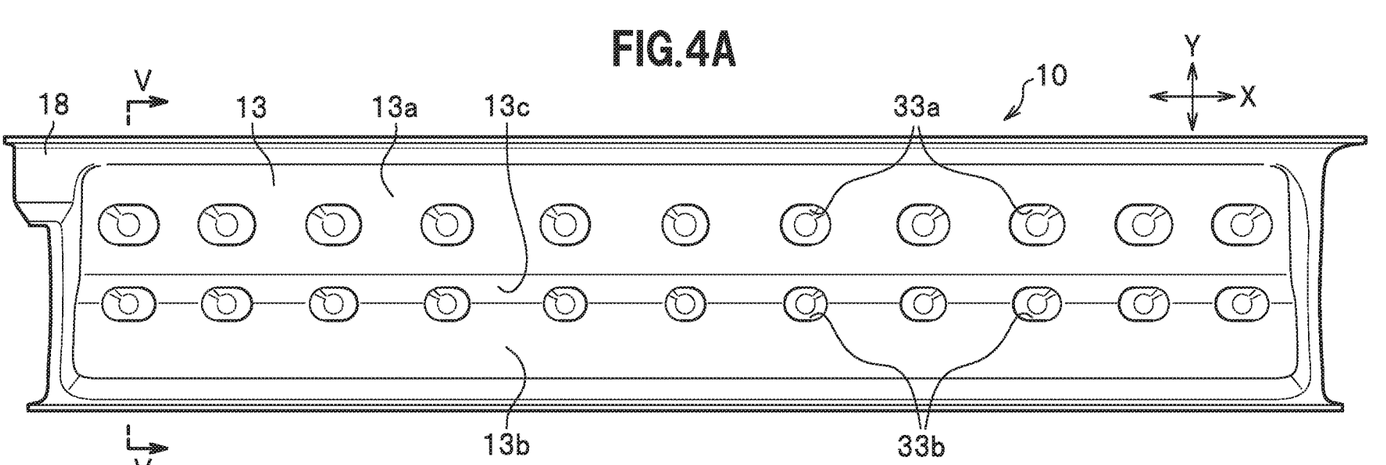
FIG. 4A is a top view of the sub air chamber member viewed from outside in a wheel radial direction.
Figure 4B:
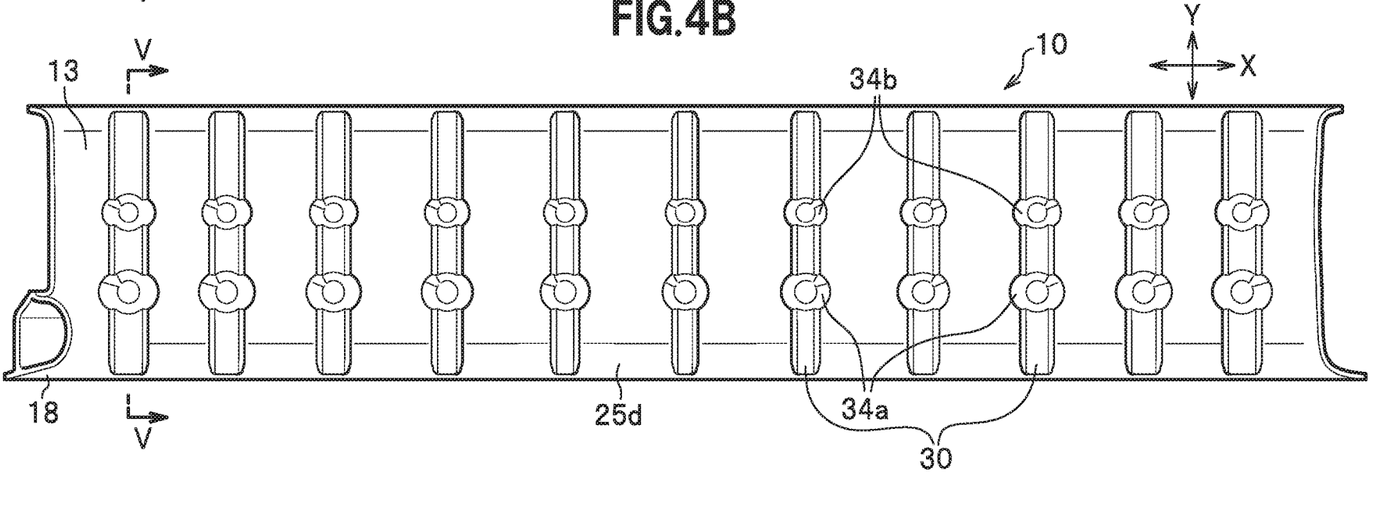
FIG. 4B is a bottom view of the sub air chamber member viewed from inside in the wheel radial direction.
Figure 5:
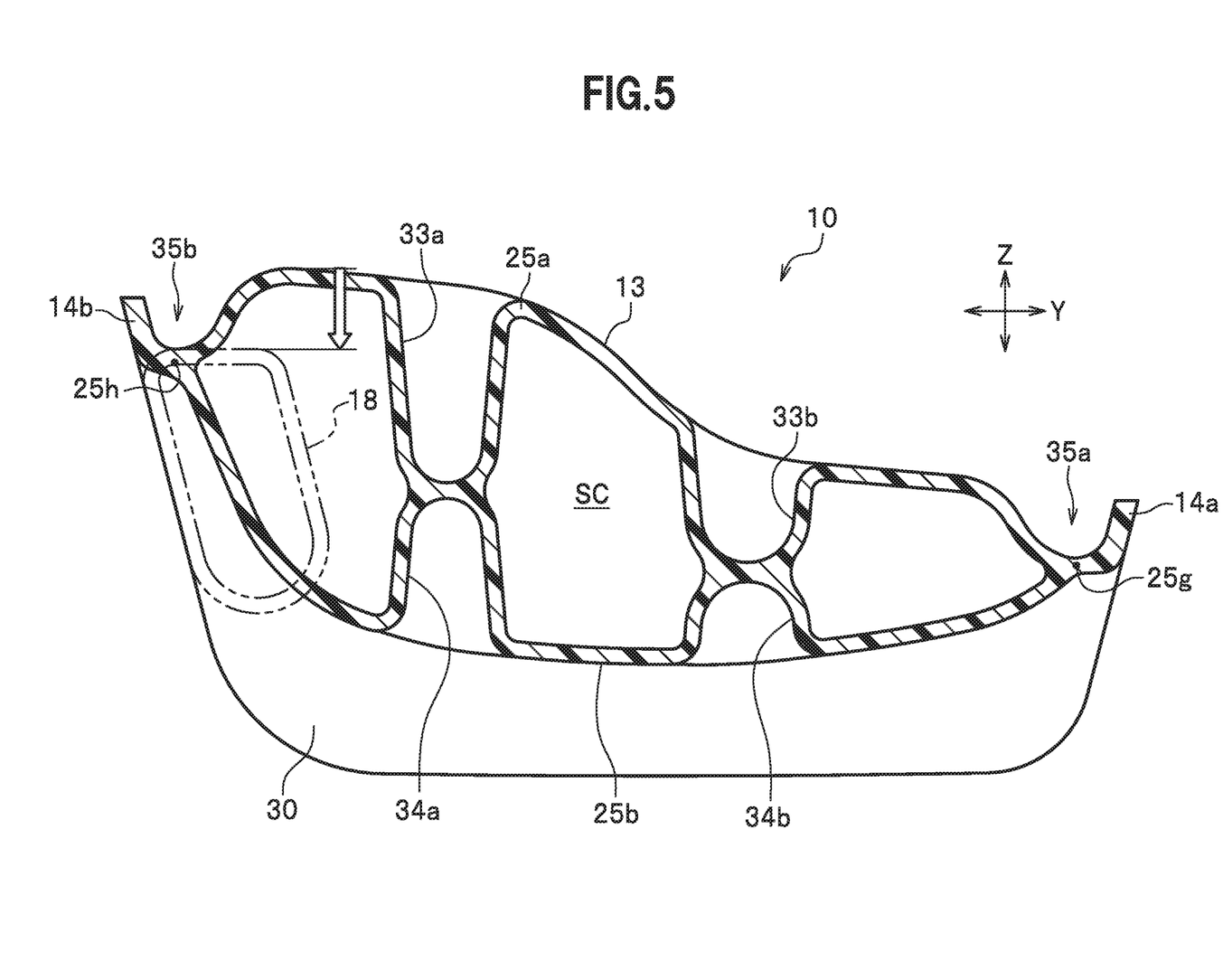
FIG. 5 is a cross-sectional view taken along line V-V of FIGS. 4A and 4B.

FIG. 4A is a top view of the sub air chamber member 10 of FIG. 3 viewed from the outside (upper side in FIG. 3) in the wheel radial direction Z, and FIG. 4B is a bottom view of the sub air chamber member 10 of FIG. 3 viewed from the inside (downside in FIG. 3) in the wheel radial direction Z. FIG. 5 is a cross-sectional view taken along line V-V of FIGS. 4A and 4B. Note that, in FIG. 5, arrangement position of the tubular body 18 is illustrated by imaginary lines.

As shown in FIG. 4A, the sub air chamber member 10 has an elongated rectangular shape in a plan view. A planar shape of the main body 13 is a substantially rectangular shape having a size slightly smaller than that of the sub air chamber member 10.

On the upper surface side of the main body 13, the above-described first region 13a, second region 13b, connection region 13c and skirt region 13d are formed to extend in a longitudinal direction. Further, on the upper surface side of the first region 13a, a plurality of (eleven in the present embodiment) upper connection portions 33a are formed in the longitudinal direction. Then, at the boundary between the connection region 13c and the skirt region 13d, upper connection portions 33b are formed across the connection region 13c and the skirt region 13d. The upper connection portions 33b are plurally formed to be aligned with the above-described upper connection portions 33a in the wheel width direction Y, and are eleven in the present embodiment.

As shown in FIG. 4B, on a lower surface side of the main body 13, lower connection portions 34a are formed at positions corresponding to the upper connection portions 33a (see FIG. 4A) on the upper surface side of the main body 13. Further, lower connection portions 34b are formed at positions corresponding to the upper connection portions 33b (see FIG. 4A). That is, the lower connection portions 34b are formed across the connection region 13c and the skirt region 13d at the boundary between the connection region 13c (see FIG. 4A) and the skirt region 13d (see FIG. 4A). Note that, in FIGS. 4A and 4B, reference numeral 18 is the tubular body 18 which will be described in detail below.

As shown in FIG. 5, the lower connection portions 34a, 34b have a substantially bottomed cylindrical shape. Then, the upper connection portions 33a and the lower connection portions 34a are joined to each other at bottom portions thereof. Further, the upper connection portions 33b and the lower connection portions 34b are also joined to each other at bottom portions thereof. As a result, the top plate 25a and the bottom plate 25b are integrally connected to each other, and form the sub air chamber SC inside them.

Note that, in the present embodiment, the top plate 25a and the bottom plate 25b are integrally connected to each other by the upper connection portions 33a, 33b and the lower connection portions 34a, 34b, which are respectively formed to be recessed from the top plate 25a and the bottom plate 25b. However, the vehicle wheel 1 of the present invention can be configured such that the top plate 25a and the bottom plate 25b are integrally connected to each other by connecting a connection portion (not shown) formed to be partially recessed from one of the top plate 25a and the bottom plate 25b to the other of the top plate 25a and the bottom plate 25b.

As shown in FIG. 2, on the lower surface side (inside in the wheel radial direction Z) of the main body 13, a bead 30 is formed to extend in a direction intersecting the first vertical wall surface 16a and the second vertical wall surface 16b. Further, the beads 30 are plurally formed to be aligned in the wheel circumferential direction X. In other words, as shown in FIG. 4B, the beads 30 are formed in a groove shape across the main body 13 in the wheel width direction Y. The beads 30 are plurally formed in a direction connecting the lower connection portions 34a and the lower connection portions 34b, and are eleven in the present embodiment.

As shown in FIG. 5, the beads 30 are formed such that the bottom plate 25b is partially recessed toward the top plate 25a side. Further, at the both end portions of the main body 13 in the wheel width direction Y, joints 25g, 25h are formed such that the top plate 25a and the bottom plate 25b forming the beads 30 are integrally joined on the beads 30 as described above. Then, the both end portions are the pressing portions 35a, 35b when the sub air chamber member 10 is pressed and attached to the well portion 11c (see FIG. 2).

(Tubular Body)

Next, the tubular body 18 (see FIG. 3) will be described. Returning to FIG. 3, the tubular body 18 is an end portion in the longitudinal direction (wheel circumferential direction X) of the sub air chamber member 10, and is arranged offset to one side edge in a short direction (the wheel width direction Y) of the sub air chamber member 10. Specifically, in the present embodiment, the tubular body 18 is arranged offset to one edge portion 14b out of the two edge portions 14a, 14b.

The tubular body 18 is formed to protrude in the longitudinal direction (wheel circumferential direction X) of the sub air chamber member 10 from the main body 13. More specifically, as shown in FIG. 4A, the tubular body 18 is provided at the end portion in the wheel circumferential direction X of the main body 13, and is formed to protrude in the wheel circumferential direction X from the first region 13a of the main body 13. As shown in FIG. 3, a communication hole 18a is formed inside this tubular body 18. In the present embodiment, a cross-sectional shape of the communication hole 18a is a substantially rectangular shape elongated in the wheel radial direction Z. The communication hole 18a communicates the tire air chamber MC (see FIG. 2) with the sub air chamber SC (see FIG. 2). As shown in FIG. 4B, in the present embodiment, the side plate 25d extends in the wheel circumferential direction X from the main body 13, and forms a side wall of the tubular body 18. Further, as shown in FIG. 5, an outer (upper in FIG. 5) position in the wheel radial direction Z of the tubular body 18 is shifted inwardly in the wheel radial direction Z from an outer position in the wheel radial direction Z of the main body 13 at a position where the tubular body protrudes, as indicated by a hollow arrow in FIG. 5.

A length of the communication hole 18a is set to satisfy an equation for obtaining a resonant frequency of the Helmholtz resonator, the equation being described by the following (equation 1).

$$f_o = C/2\pi \times \sqrt{(S/V(L+\alpha \times \sqrt{S}))} \quad \text{(equation 1)}$$

$f_o$ (Hz): resonant frequency
C (m/s): sound speed inside sub air chamber SC (=sound speed inside tire air chamber MC)
V (m$^3$): volume of sub air chamber SC
L (m): length of communication hole 18a
S (m$^2$): cross-sectional area of opening of communication hole 18a
α: correction factor
Incidentally, the resonant frequency $f_o$ is matched to the resonant frequency of the tire air chamber MC.
(Edge Portion)

Next, the edge portions 14a, 14b (see FIG. 3) will be described. As shown in FIG. 3, the edge portions 14a, 14b respectively extend outwardly in the wheel radial direction Z from the main body 13 and in the short direction (wheel width direction Y) of the sub air chamber member 10.

More specifically, as shown in FIG. 2, the edge portion 14a is formed to extend outwardly (upwardly in FIG. 2) in the wheel radial direction Z from the joint 25e between the top plate 25a and the side plate 25c. In the present embodiment, the edge portion 14a extends in a rising direction of the side plate 25c from the joint 25e.

Further, as shown in FIG. 2, the edge portion 14b is formed to extend outwardly (upwardly in FIG. 2) in the wheel radial direction Z from the joint 25f between the top plate 25a and the side plate 25d. In the present embodiment, the edge portion 14b extends in a rising direction of the side plate 25d from the joint 25f.

Among the both edge portions 14a, 14b, a position of the edge portion 14b on the first region 13a side is shifted outwardly in the wheel radial direction Z from a position of the edge portion 14a on the second region 13b side.

The tip of the edge portion 14a is fitted into the groove 17a, and the tip of the edge 14b is fitted into the groove 17b. Thus, the sub air chamber member 10 is attached to the well portion 11c of the rim 11. Incidentally, it is desirable that extending directions of the edge portions 14a, 14b respectively coincide with rising directions of the side plates 25c, 25d, however, a slight deviation in the extending directions is allowed if the edge portions 14a, 14b respectively extend in the rising directions of the side plates 25c, 25d.

In the present embodiment, thickness of the edge portions 14a, 14b is set to substantially the same thickness as the top plate 25a, the bottom plate 25b and the side plates 25c, 25d. Then, the edge portions 14a, 14b have spring elasticity by appropriately selecting thickness and material thereof.

The sub air chamber member 10 according to the present embodiment described above is assumed to be a resin molded product, but is not limited thereto, and can be formed of other materials such as metal. When the sub air chamber member 10 is made of resin, blow moldable lightweight resin having high rigidity is desirable in view of weight reduction, improvement of mass productivity, reduction of manufacturing cost, ensuring airtightness of the sub air chamber SC, and the like. Among them, polypropylene having high resistance to repeated bending fatigue is particularly desirable.

<Method of Attaching Sub Air Chamber Member>

Figure 6A:
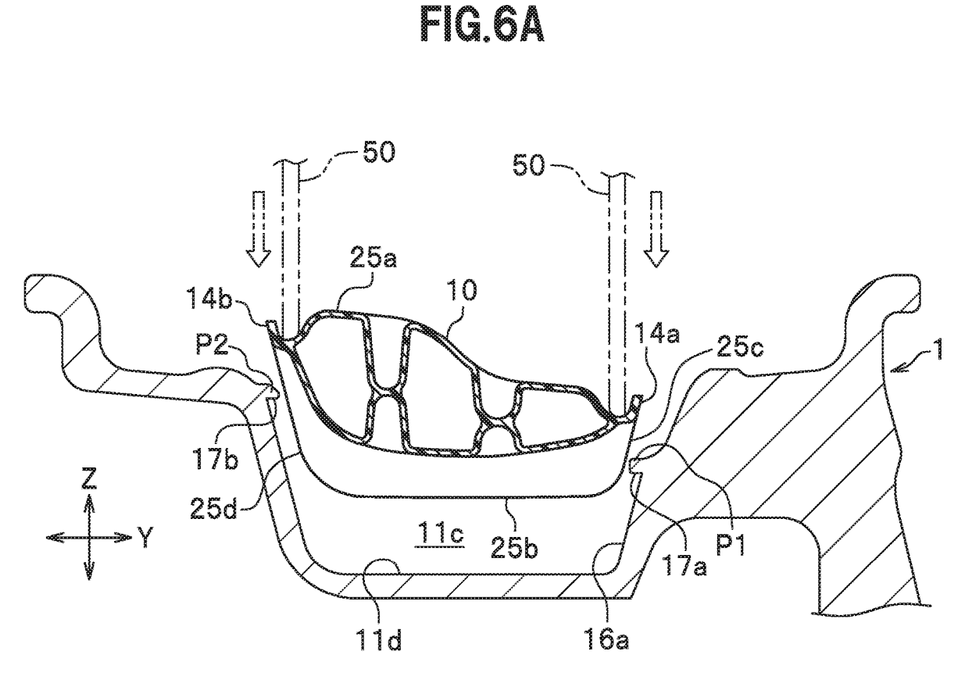
FIGS. 6A and 6B are process explanatory views for explaining a method of attaching the sub air chamber member to a well portion of a rim.
Figure 6B:
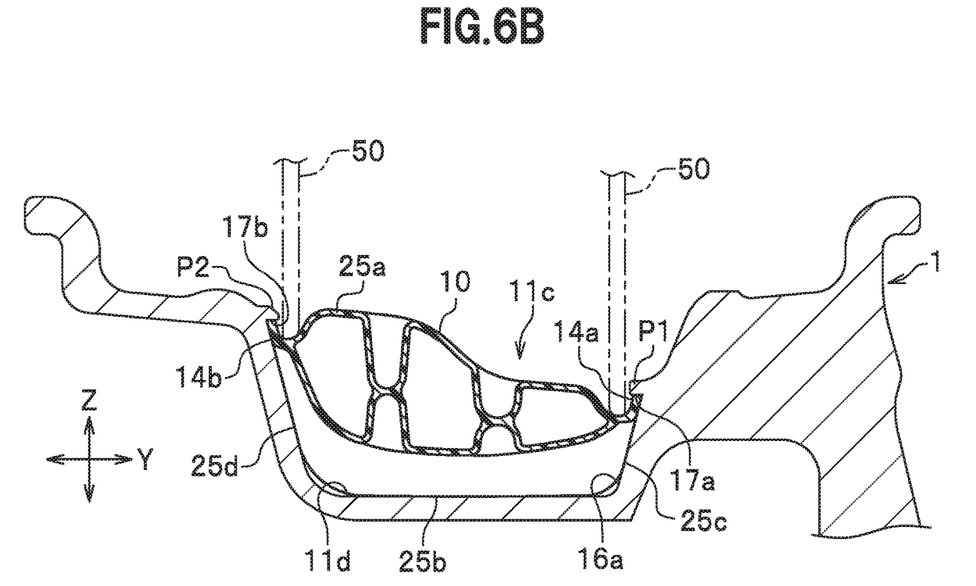

Next, a method of attaching the sub air chamber member 10 to the well portion 11c will be described. FIGS. 6A and 6B are process explanatory views for explaining the method of attaching the sub air chamber member 10 to the well portion 11c. In the present embodiment, it is assumed to use a pair of pushers (pressing devices) 50 (see FIGS. 6A and 6B) for pressing the sub air chamber member 10 to the outer circumferential surface 11d of the well portion 11c in order to attach the sub air chamber member 10 to the well portion 11c.

The pushers 50 include, for example, those for generating a pressing force by air pressure of an air cylinder. Incidentally, in FIGS. 6A and 6B, the pushers 50 are indicated by imaginary lines (two-dot chain lines) for convenience of drawing.

The pushers 50 used in the present embodiment include, for example, a plate member including an edge portion having an arc-shaped contour which follows a curvature in the longitudinal direction (wheel circumferential direction X in FIG. 3) of the sub air chamber member 10, however, the pushers 50 which can be applied to the present invention are not limited thereto but can be appropriately changed in design.

As shown in FIG. 6A, the sub air chamber member 10 is placed over the well portion 11c at first in this attachment method. Then, the pair of pushers 50, 50 are respectively pressed against the top plate 25a close to the edge portions 14a, 14b, specifically, against the pressing portions 35a, 35b (see FIG. 5), so that a load is applied in a direction of hollow arrows. Thus, although not shown, as the sub air chamber member 10 approaches the outer circumferential surface 11d of the well portion 11c, the edge portions 14a, 14b are displaced inwardly in the wheel width direction Y by a reaction force received from the projecting portions P1, P2.

Then, as shown in FIG. 6B, when the pushers 50, 50 press the top plate 25a and the bottom plate 25b is disposed along the outer circumferential surface 11d of the well portion 11c, the edge portions 14a, 14b are restored by elastic force thereof, to be respectively fitted into the grooves 17a, 17b at the tips thereof. In this manner, the sub air chamber member 10 is attached to the outer circumferential surface 11d of the well portion 11c, and a series of steps of this attachment method ends.

As described above, in the present embodiment, it is assumed that the both end portions of the main body 13 are respectively pressed by the pushers 50 (see FIGS. 6A and 6B), however, the present invention is not limited thereto.

For example, it is possible to fit the edge portion 14a into the groove 17a by tilting the sub air chamber member 10 in advance, and then to fit the edge portion 14b into the groove 17b by pressing the pressing portion 35b (see FIG. 5) with the pusher 50. Further, it is also possible to fit the edge portion 14b into the groove 17b in advance, and then to fit the edge portion 14a into the groove 17a by pressing the pressing portion 35a with the pusher 50.

The vehicle wheel 1, which is applied to the attachment method of attaching the sub air chamber member 10 to the well portion 11c by pressing only one of the pressing portions 35a, 35b as described above, is not necessary to include the two pressing portions 35a, 35b, but can be configured to include either one of the pressing portions 35a and 35b.

Figure 7:
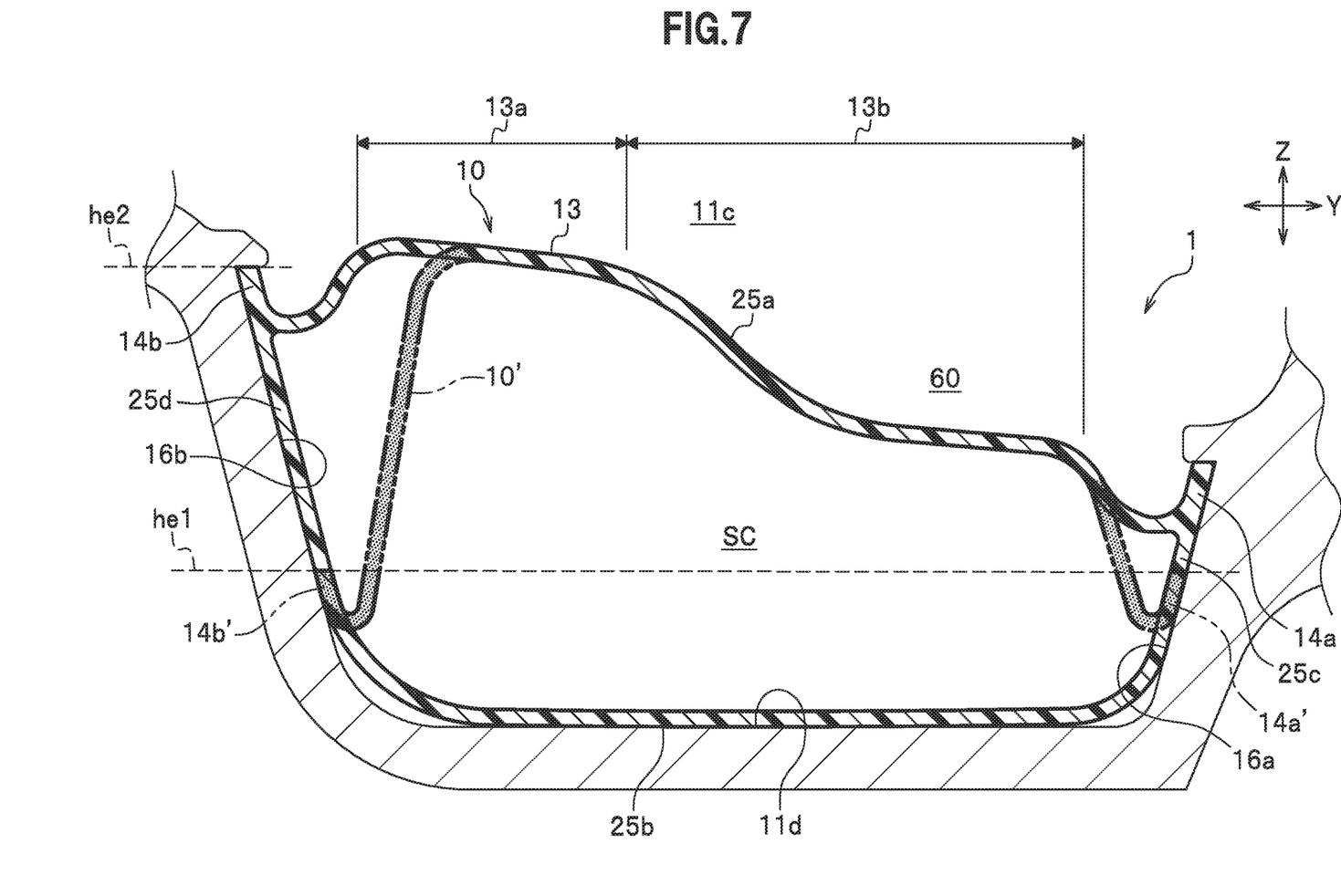
FIG. 7 is a schematic view for explaining operational effects obtained by the vehicle wheel according to the embodiment of the present invention as compared to a comparative example.

Next, operational effects obtained by the vehicle wheel 1 of the present embodiment will be described. FIG. 7 is a schematic view for explaining operational effects obtained by the vehicle wheel 1 according to the present embodiment as compared to a comparative example. Note that, in FIG. 7, reference numeral 10' indicates a sub air chamber of the comparative example, and reference numerals 14a', 14b' indicate edge portions of the comparative example. First, configuration of the vehicle wheel 1 according to the present embodiment will be briefly described with reference to FIG. 7.

As shown in FIG. 7, in the vehicle wheel 1 according to the present embodiment, the main body 13 of the sub air chamber member 10 is formed with the top plate 25a, the bottom plate 25b and the pair of side plates 25c, 25d. Further, in the cross-sectional view taken along the wheel width direction Y, the main body 13 is formed such that one end (the first region 13a side) is higher than the other end (the second region 13b side) in height on the outer circumferential surface 11d of the well portion 11c. Furthermore, among the both edge portions 14a, 14b, a position he2 of the edge portion 14b on one end side (the first region 13a side) is shifted outwardly (upwardly in FIG. 7) in the wheel radial direction Z from a position of the edge portion 14a on the other end side (the second region 13b side).

In contrast, in the comparative example, a sub air chamber member indicated by reference numeral 10' does not have the pair of side plates 25c, 25d as the main body 13 of the present embodiment. Therefore, the sub air chamber member 10' of the comparative example includes the edge portions 14a', 14b' respectively formed on the both ends in the wheel width direction Y of the bottom plate 25b, and a position of the edge portions 14a', 14b' is a position indicated by reference numeral he1. In the sub air chamber member 10' of the comparative example, when attempting to increase a volume of the sub air chamber SC, the top plate 25a bulges upward above the bottom plate 25b.

That is, in the sub air chamber member 10' of the comparative example, the position he1 of the edge portions 14a', 14b' is biased inwardly in the wheel radial direction Z from the position he2 of the edge portion 14b of the present embodiment. Therefore, when the sub air chamber member 10' is attached to the well portion 11c as described above, a pressing distance to move tips of the edge portions 14a', 14b' into the grooves by pressing them with the pusher 50 is increased.

In contrast, in the vehicle wheel 1 according to the present embodiment, since the position he2 of the edge portion 14b is shifted outwardly in the wheel radial direction Z from the position he1, the pressing distance by the pusher 50 is shorter than that of the comparative example.

That is, with the vehicle wheel 1, when fitting the edge portions 14a, 14b into the grooves 17a, 17b by pressing the top plate 25a with the pusher 50, the distance to move the edge portions 14a, 14b into the grooves 17a, 17b (see FIGS. 6A and 6B) while applying the load to the edge portions 14a, 14b is reduced. As a result, attachment operation of the sub air chamber member 10 by the pusher 50 is simplified.

Further, the vehicle wheel 1 is different from the conventional vehicle wheel (for example, see Patent Document 1), and the main body 13 of the sub air chamber member includes the side plates 25c, 25d in addition to the top plate 25a and the bottom plate 25b. Then, the edge portions 14a, 14b respectively extend from the joints 25e, 25f between the top plate 25a and the side plates 25c, 25d rising from the both ends of the bottom plate 25b. Therefore, with the vehicle wheel 1, even when the main body 13 is arranged to be extended in accordance with the well portion 11c which is extended inwardly in the wheel radial direction Z, the positions of the edge portions 14a, 14b in the wheel radial direction Z are shifted outwardly in the wheel radial direction Z by the side plates 25c, 25d.

Further, the vehicle wheel 1 is different from the conventional vehicle wheel (for example, see Patent Document 1), and the two grooves 17a, 17b are respectively formed in the two rising portions S1, S2 (see FIG. 2) of the well portion 11c. Therefore, even when the well portion 11c is extended inwardly in the wheel radial direction Z, heights of the rising portions S1, S2 of the well portion 11c are also inevitably increased. Therefore, with the vehicle wheel 1 of the present invention, it is possible to increase the volume of the sub air chamber SC by extending the well portion 11c inwardly in the wheel radial direction Z without significant design change such as changing heights of vertical walls as the conventional vehicle wheel (for example, see Patent Document 1). That is, it is possible to increase the volume of the sub air chamber SC even when the wheel width is reduced, thereby providing the vehicle wheel 1 which is reduced in weight and is excellent in fuel consumption and silencing performance.

Further, in this vehicle wheel 1, the pair of side plates 25c, 25d of the sub air chamber member 10 respectively rise outwardly in the wheel radial direction Z from the both ends in the wheel width direction Y of the bottom plate 25b, along the rising portions S1, S2 respectively corresponding to the side plates 25c, 25d. Therefore, with the vehicle wheel 1, it is possible to make the most of a space for housing the sub air chamber member 10 formed between the two rising portions S1, S2 of the well portion 11c, thereby ensuring the volume of the sub air chamber member SC more largely.

In the vehicle wheel 1, the edge portions 14a, 14b of the sub air chamber 10 respectively extend in the rising directions of the side plates 25c, 25d from the main body 13. With the vehicle wheel 1, it is possible to arrange the edge portions 14a, 14b together with the side plates 25c, 25d along the rising portions S1, S2 of the well portion 11c, thereby utilizing the housing space of the sub air chamber member 10 more efficiently. Then, when the pusher 50 is in contact with the top plate 25a and the load is applied in the direction of the hollow arrow as described above, the edge portions 14a, 14b is displaced (bent) in the wheel width direction Y, to be fitted into the groove 17a, 17b. Therefore, with the vehicle wheel 1, it is possible to bend the edge portions 14a, 14b with a smaller load as compared to the conventional vehicle wheel (for example, see Patent Document 1) in which the edge portions are bent in the wheel radial direction Z, thereby attaching the sub air chamber member 10 to the outer circumferential surface 11d of the well portion 11c with a small load.

Further, in the vehicle wheel 1, the side plates 25c, 25d of the main body 13 are respectively arranged along the first vertical wall surface 16a and the second vertical wall surface 16b, which are defined by the two rising portions S1, S2 of the well portion 11c. Therefore, when the sub air chamber member 10 is arranged on the outer circumferential surface 11d of the well portion 11c, the both side plates 25c, 25d of the main body 13 are fitted into the grooves 17a, 17b at the edge portions 14a, 14b thereof without interfering with the first vertical wall surface 16a and the second vertical wall surface 16b. Therefore, with the vehicle wheel 1, when the sub air chamber member 10 is attached to the outer circumferential surface 11d of the well portion 11c, it is possible to further reduce the load applied to the sub air chamber member 10. Consequently, production efficiency of the vehicle wheel 1 is further improved.

Further, in the vehicle wheel 1, the first vertical wall surface 16a and the second vertical wall surface 16b respectively have the projecting portions P1, P2 projecting inwardly in the wheel width direction Y. The pair of grooves 17a, 17b are respectively formed inside the projection portions P1, P2 in the wheel radial direction Z, and respectively formed between the projecting portion P1 and the first vertical wall surface 16a, and between the projecting portion P2 and the second vertical wall surface 16b. The tips of the edge portions 14a, 14b are respectively fitted into the pair of grooves 17a, 17b.

With the vehicle wheel 1, since the tips of the edge portions 14a, 14b are fitted into the grooves 17a, 17b so as to be pressed inwardly in the wheel radial direction Z of the projecting portions P1, P2, it is possible to firmly support the main body 13 of the sub air chamber member 10 by the well portion 11c via the edge portions 14a, 14b even when the vehicle wheel 1 rotates so that centrifugal force is applied to the sub air chamber member 10.

Further, since the sub air chamber member 10 is attached to the rising portions S1, S2 of the rim 11 forming the well portion 11c, the vehicle wheel 1 is different from the conventional vehicle wheel (for example, see Patent Document 1), and it is not necessary to erect the vertical walls on the outer circumferential surface 11d of the well portion 11c. Therefore, the vehicle wheel 1 of the present embodiment has a simple structure without the vertical walls.

Further, with the vehicle wheel 1, by omitting the vertical walls, it is possible to more largely ensure a space where the sub air chamber member 10 is arranged on the outer circumferential surface 11d of the well portion 11c as compared to the conventional vehicle wheel (for example, see Patent Document 1). Therefore, with the vehicle wheel 1 of the present embodiment, it is possible to expand the sub air chamber SC formed in the sub air chamber member 10 (main body 13).

Further, in the vehicle wheel 1, the main body 13 of the sub air chamber member 10 has the recessed portion 15 (see FIG. 2) into which the bead portions 21a, 21b of the tire 20 is dropped during assembly of the tire 20, in a partial region thereof outward in the wheel radial direction Z. Therefore, with the vehicle wheel 1, it is possible to expand the sub air chamber SC formed in the sub air chamber member 10 (main body 13) while maintaining ease of assembly of the tire 20.

Further, in the vehicle wheel 1, the upper connection portions 33a, 33b and the lower connection portions 34a, 34b are respectively joined together in the sub air chamber SC, so that the top plate 25a and the bottom plate 25b are integrated, and thus mechanical strength of the sub air chamber member 10 is further increased. Furthermore, with the vehicle wheel 1, the upper connection portions 33a, 33b and the lower connection portions 34a, 34b are respectively joined together, to suppress variation of the volume of the sub air chamber SC, and thus it is possible to more effectively exhibit silencing function.

Although the present embodiment has been described hereinabove, the present invention is not limited to the above embodiment, but can be embodied in various forms. In the above embodiment, when the sub air chamber 10 is attached to the well portion 11c, it is configured to fit the edge portions 14a, 14b into the grooves 17a, 17b in a step using the pair of pushers 50, 50, however, the present invention can be configured to fit the edge portion 14b into the groove 17b after fitting the edge portion 14a into the groove 17a by tilting the sub air chamber 10, and it can also be configured to fit the edge portion 14a into the groove 17a after fitting the edge portion 14b into the groove 17b.

In the above embodiment, although the cross-sectional shape of the communication hole 18a is a vertically elongated substantially rectangular shape, it can be formed to be a vertically elongated ellipse or a vertically elongated polygon. Further, the cross-sectional shape of the communication hole 18a may not be a vertically elongated shape.

Further, in the above embodiment, although the vehicle wheel 1 is assumed to have the four sub air chamber members 10, the vehicle wheel 1 according to the present invention may have two, three or more than four sub air chamber members 10 at regular intervals in the wheel circumferential direction.

Further, in the above embodiment, although the recessed portion 15 is formed to be recessed in the region closer to the disk 12 than the central portion in the wheel width direction Y of the main body 13, it may be configured to be recessed in the central portion in the wheel width direction Y of the main body 13. Furthermore, the recessed portion 15 may be configured to be recessed in the region opposite to the disk 12 across the central portion in the wheel width direction Y of the main body 13.

REFERENCE SIGNS LIST

1: vehicle wheel
10: sub air chamber member
11: rim
11a: bead seat
11c: well portion
11d: outer circumferential surface
12: disk
13: main body
13a: first region
13b: second region
13c: connection region
13d: skirt region
14a: edge portion
14b: edge portion
15: recessed portion
16a: first vertical wall surface
16b: second vertical wall surface
17a: groove
17b: groove
18a: communication hole
25a: top plate
25b: bottom plate
25c: side plate
25d: side plate
30: bead
33a: upper connection portion
33b: upper connection portion
34a: lower connection portion
34b: lower connection portion
X: wheel circumferential direction
Y: wheel width direction
Z: wheel radial direction
SC: sub air chamber
MC: tire air chamber
S1: rising portion
S2: rising portion

The invention claimed is:

1. A vehicle wheel comprising:

a well portion having a first vertical wall surface and a second vertical wall surface spaced away from the first vertical wall surface, each of the vertical wall surfaces having a projecting portion thereon extending inwardly in a wheel width direction, the wall surfaces and projecting portions cooperating to define a pair of grooves;

a plurality of sub air chamber members as Helmholtz resonators attached to the well portion of the vehicle wheel, wherein each sub air chamber member comprises:

a main body which forms a sub air chamber in a space surrounded by a top plate, a bottom plate, and a pair of side plates respectively rising outwardly in a wheel radial direction from opposed side portions, in the wheel width direction, of the bottom plate; and edge portions which respectively extend from upper ends of the side plates of the main body, the edge portions being respectively fitted into the grooves formed in the well portion, so that the main body is attached to the well portion, wherein the edge portions respectively extend from joints between the top plate and the side plates in rising directions of the side plates, wherein:

the top plate has two end portions, in the wheel width direction, which are recessed inwardly in the wheel radial direction, each edge portion has a radially outer surface with a defined thickness, the radially outer surface of each edge portion spaced apart in a radial direction from a corresponding respective one of said joints by a length, each edge portion is in contact with a portion of the corresponding vertical wall surface along the edge portion's entire length, and each radially outer surface is in contact with one of the respective projecting portions along the entire thickness thereof.

2. The vehicle wheel according to claim 1, wherein the pair of grooves are respectively formed in the first vertical wall surface defined by a first rising portion of a rim forming the well portion and in the second vertical wall surface defined by a second rising portion of the rim forming the well portion.

* * * * *